(Model.)
2 Sheets—Sheet 1.
C. G. CONN.
TRUCK.
No. 343,890.
Patented June 15, 1886.
FIG. I.
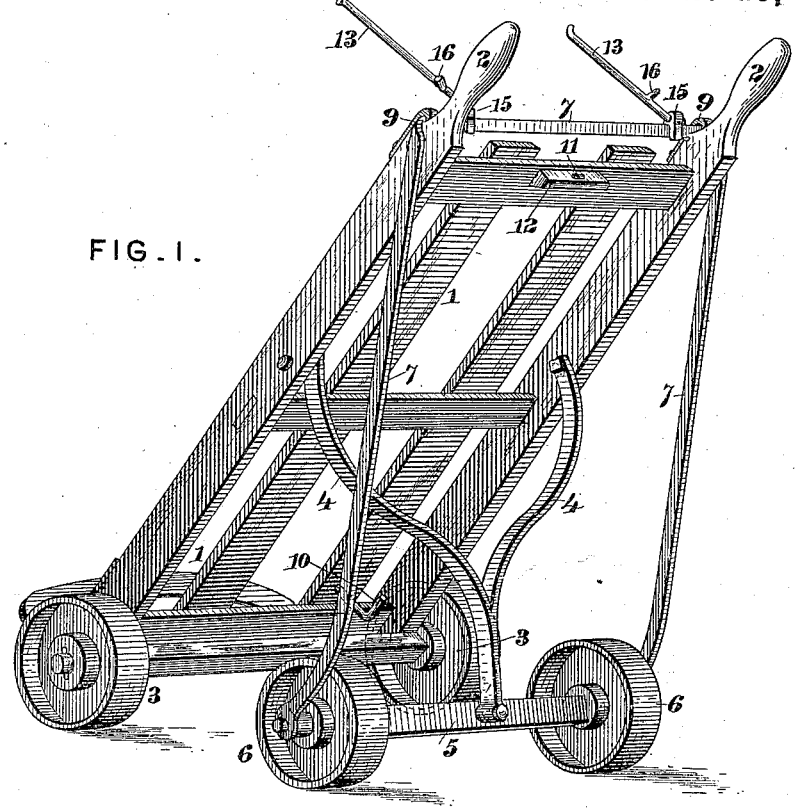
FIG. II.
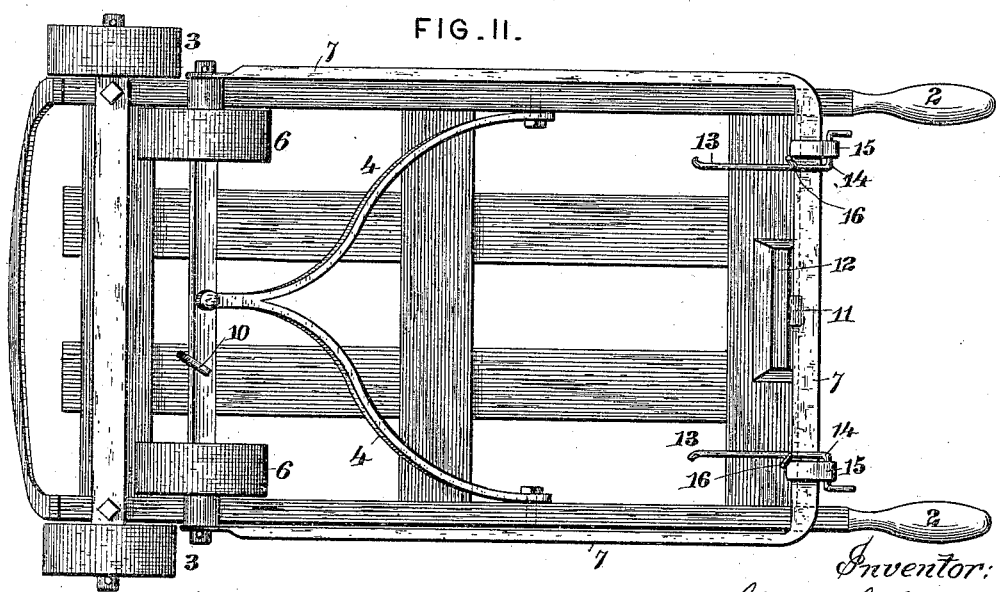
Attest: Geo. T. Smallwood.
F. A. Hopkins
Inventor:
Charles G. Conn
By Knight Bros.
Attys (Model.) 2 Sheets—Sheet 2.
C. G. CONN.
TRUCK.
No. 343,890. Patented June 15, 1886.
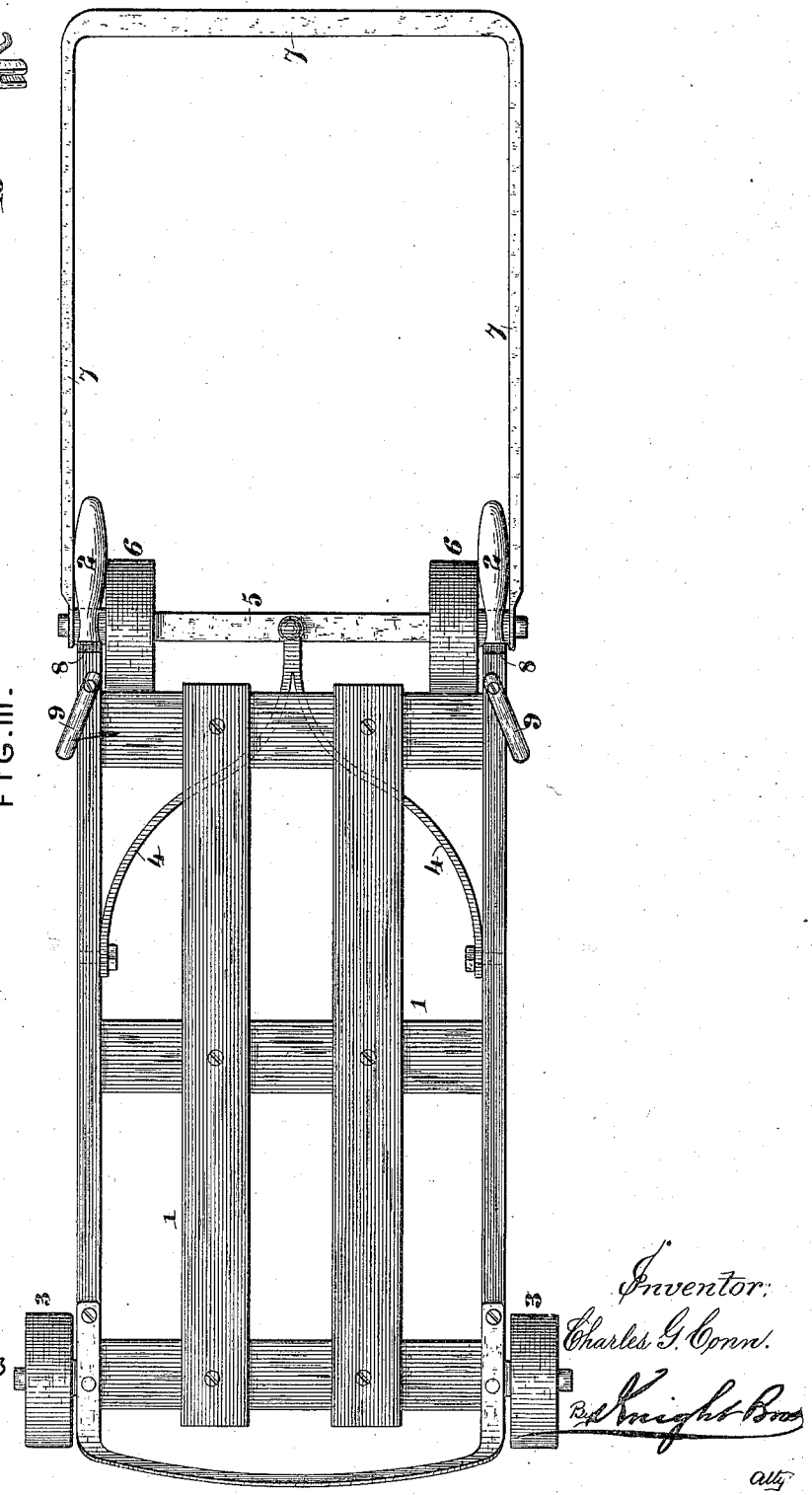

UNITED STATES PATENT OFFICE.

CHARLES G. CONN, OF ELKHART, INDIANA.

TRUCK.

SPECIFICATION forming part of Letters Patent No. 343,890, dated June 15, 1886.

Application filed March 3, 1886. Serial No. 193,887. (Model.)

*To all whom it may concern:*

Be it known that I, CHARLES G. CONN, a citizen of the United States, residing at Elkhart, in the county of Elkhart and State of Indiana, have invented certain new and useful Improvements in Trucks, of which the following is a specification.

My invention has for its object the provision of an attachment for a two-wheeled warehouse-truck, whereby the same may be converted into a four-wheeled truck at will, the bed of the truck being supported on the four wheels in either inclined or horizontal position. When supported in inclined position, arms may be fixed to the truck near the handles for holding open the mouth of a bag.

In order that my invention may be fully understood, I will proceed to describe it with reference to the accompanying drawings, in which—

Figure I is a perspective view of my improved truck, the bed of the truck being inclined. Fig. II is an under side view showing the device folded up for transportation or for use with two wheels. Fig. III is a plan view showing the truck horizontal. Fig. IV shows one of the bag-holders detached.

The bed 1, handles 2, and two wheels, 3, of the truck may be arranged in customary manner.

To the handle bars of the bed 1 are pivoted the arms of a bifurcated bracket or bolster, 4. To the said bracket or bolster is pivoted at center an axle, 5, bearing two additional wheels, 6. The bracket 4 may be arranged in vertical or nearly vertical position under the truck, which is then made to assume the inclined position shown in Fig. I. When so arranged, the rigidity of the whole frame of the truck on its four wheels is assured by a ⊓-shaped brace, 7, the ends of whose arms grasp the axle 5, and whose horizontal portion rests in grooves 8 in the handle-bars, and is retained therein by pivoted dogs 9.

When the truck is in the horizontal position shown in Fig. III, its handle end is supported on bracket or bolster 4, and the brace 7 projects forward in convenient form and position to serve as a handle for pulling the truck. In this position the pivotal connection between the bracket 4 and axle 5 is especially useful, permitting the turning of the truck.

When folded up for use as a two-wheeled truck, as shown in Fig. II, the axle 5 is supported by a swiveled hook, 10, and the horizontal portion of brace 7 is held close to the bed of the truck by a spring or other projection, 11, from the block 12.

When held in the inclined position shown in Fig. I, arms may be fixed to the truck for holding open the mouth of a bag placed thereon. Such arms are shown at 13 in Figs. I and IV. They are bent at right angles at 14 to enter clips 15, which rest loosely, or with any desired friction, over the horizontal portion of brace 7. The inner end of the arm is turned under the brace 7 to hold it down thereon. The outwardly-projecting portion of the arms carries spurs 16, to hook into the edge or mouth of a bag, and so hold the latter open while on the truck.

Having thus described my invention, the following is what I claim as new therein:

1. In combination with a truck having customary axle and wheels, a bracket or bolster pivoted to said truck, a wheeled axle carried at the free extremity of said bracket or bolster, and means for securing said axle in any desired position relatively to the customary wheels and axle, substantially as set forth.

2. In combination with a truck having customary wheels and axle, a second wheeled axle adjustably connected to said truck and adapted to support the handle end of the truck-bed or be placed in inoperative position, substantially as set forth.

3. In combination with a truck-bed having fixed axle and wheels thereon, a bracket or bolster pivoted to said bed, an axle connected to said bracket or bolster, and wheels on said axle, substantially as set forth.

4. In combination with a truck-bed having customary axle and wheels, a bracket pivoted to said bed, an axle pivoted to said bracket, and wheels on said axle, substantially as set forth.

5. In combination with a truck-bed having customary axle and wheels, a bracket or bolster pivoted to said bed, an axle whereon said bracket is supported, wheels on said axle, and a brace connecting said axle and bed at will, substantially as set forth.

6. In combination with a truck-bed having customary axle and wheels, a bracket or bolster pivoted on said bed, an axle supporting said bracket or bolster, wheels on said axle, a brace connecting said axle and bed, and pivoted dogs on said bed for retaining said brace, substantially as set forth.

7. In combination with a truck-bed having customary axle and wheels, a bracket or bolster pivoted to said bed, an axle for supporting said bracket or bolster, wheels on said axle, and a pivoted hook for retaining said axle close to said bed when the wheels on the former are out of use, substantially as set forth.

8. In combination with a truck-bed having horizontal brace-rod between its handles, clips on said rod and bag-holding arms pivoted in said clips, substantially as set forth.

9. A bag-holder for trucks, consisting of a clip or fastener, an arm pivoted therein, and having bag-holding spurs on one member and a projecting part for engagement under a rod or bar on the other member, substantially as set forth.

10. In combination with a truck having bracket for holding it in inclined position, two pivoted bag-holding arms on said truck near its handles, substantially as set forth.

CHARLES G. CONN.

Witnesses:
C. W. FISH,
E. C. BIEKEL.